Aug. 31, 1965  J. E. DEAVENPORT  3,204,144
OSCILLOSCOPE CONTROL CIRCUITRY
Filed Feb. 5, 1963                            3 Sheets-Sheet 3

INVENTOR.
JOE E. DEAVENPORT
BY
ATTORNEY

United States Patent Office 3,204,144
Patented Aug. 31, 1965

3,204,144
OSCILLOSCOPE CONTROL CIRCUITRY
Joe E. Deavenport, San Diego, Calif., assignor to California Instrument Corporation, San Diego, Calif., a corporation of California
Filed Feb. 5, 1963, Ser. No. 256,415
20 Claims. (Cl. 315—24)

This invention relates to oscilloscope control circuitry and more particularly to circuitry in an oscilloscope for determining the amplitude, frequency, D.C. offset and other parameters of a signal under test and for employing correction voltages in response to the determination, that ensures an oscilloscope display of the signal having the desired size, positioning and number of cycles.

Using oscilloscopes to display test signals and to critically analyze the test signal's characteristics, waveform and the like involves many considerations. Several of such considerations that are considered important are the correct positioning of the signal to obtain maximum sensitivity, display of a given number of cycles, and the time required to successively calibrate the oscilloscope to serially display signals having different magnitudes, frequencies or D.C. offsets. To effectively analyze the signal's waveform, a cyclic signal must be displayed on the oscilloscope within a given range of cycles and with a sufficient size to permit accurate analysis of the waveform within the sensitivity of the display tube. At the same time the waveform must not exceed the physical limitations of the display screen of the oscilloscope.

As is well known, the task of setting up an oscilloscope to the correct calibration for displaying a particular signal and permit its effective analysis requires a considerable expenditure of time. This time expenditure is multiplied several times where several signals of differing magnitudes or frequencies are required to be successively analyzed. Since oscilloscopes known in the art are required to be set up manually through suitable hand operated control devices for each signal to be displayed, they are time consuming instruments to use and, as a result, their use can lead to inaccuracies or misleading determinations. Oscilloscopes that can quickly and accurately present a proper size and positioned picture of the waveform of a signal under test regardless, within reasonable limits, of its amplitude, frequency or D.C. offset, provides a distinct addition to the art.

It is therefore an object of this invention to provide an improved oscilloscope control circuitry.

It is another object of this invention to provide an improved oscilloscope circuitry that automatically presents a proper size and positioned display of a waveform of a signal under test.

It is another object of this invention to provide an improved oscilloscope circuitry that automatically detects the frequency of a signal and provides a predetermined coordinated sweep speed.

It is another object of this invention to provide oscilloscope circuitry that detects the voltage magnitude of a signal and automatically, vertically positions the signal on the screen of the display cathode ray tube.

It is another object of this invention to provide improved oscilloscope circuitry that detects the direct current carrier of a test signal and automatically provides correct direct current positioning of the signal relative to the centerline on the display screen of the cathode ray tube.

It is another object of this invention to provide improved oscilloscope control circuitry that detects the amplitude, frequency, or D.C. offset of a signal and automatically displays the correction applied to the oscilloscope to provide correct display of a signal waveform on the screen of the cathode ray tube.

These and other objects will become more apparent when read in light of the accompanying drawings in which.

Figure 1:
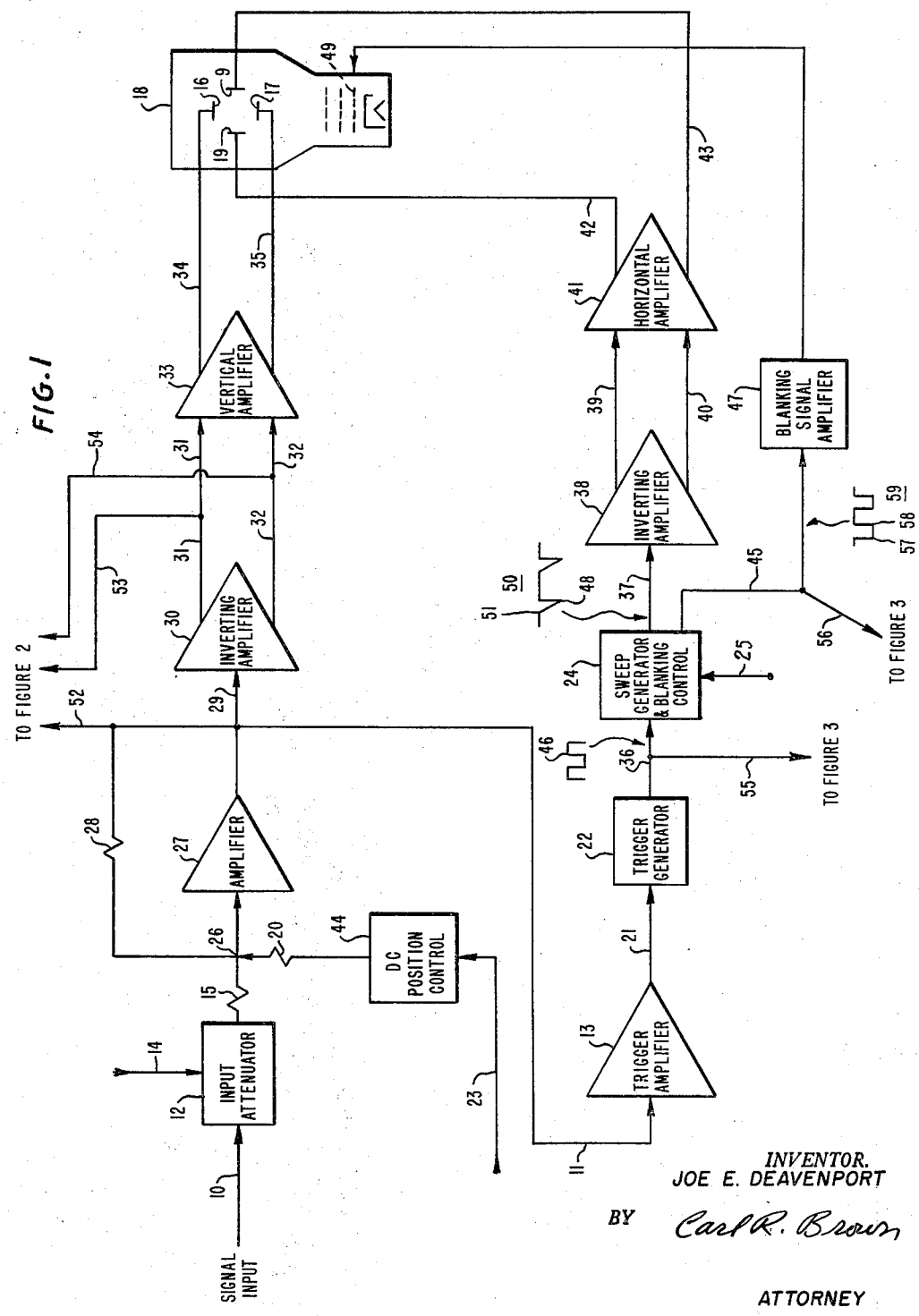
FIGURE 1 is a circuit diagram of the main circuitry of the oscilloscope for receiving the input signal, providing amplification of the signal, and for providing sweep voltage and blanking control voltage for driving the oscilloscope to display the input signal.

Referring now to FIGURE 1, a cathode ray tube 18 of conventional design is capable of displaying illuminated traces on its display screen that are representative of the test signals input provided on line 10. The display of the cathode ray tube 18 is controlled by voltages generated in the groups of circuits hereinafter described. The unknown input signal to be displayed is first supplied to the input attenuating means 12 of the vertical deflection circuitry means through input line 10. The input attenuating means 12 comprises a conventional, resistance-capacitor, attenuator that utilizes conventional adjustable steps in which various degrees of attenuation are available to attenuate or reduce the magnitude of the input signal by discrete amounts such as one, two, five, ten, etc., while not affecting the input signal waveform, frequency, or composition. The attenuation is capable of reducing the magnitude of the signal to that within the vertical range deflection of the cathode ray tube screen. The attenuating means or attenuator 12 may comprise a series of R.C. networks such as are shown in "Pulse and Digital Control Circuits," published in 1956 by McGraw and Hill Book Company, Inc., New York, New York, whose authors are Jacob Millman and Herbert Taub, which networks can have appropriate amounts of attenuation. The input attenuator 12 is controlled by attenuator control 100, whose operational relationship to the circuitry will be more specifically described hereinafter in FIGURE 2, and which may comprise conventional groups of relays or conventional rotary switch arrangements that are conventionally actuated by signals from the vertical range register 98 to operate the R.C. networks of the input attenuator 12 and insert the correct value of attenuation into the circuit.

The attenuated signal output of the input attenuator 12 feeds through resistor 15 and through a summing junction 26 to a conventional amplifier 27. Amplifier 27 uses a feed back control circuit through resistor 28 to the summing junction 26. The gain of amplifier 27 is a function of the resistance valve of resistor 28, resistor 15 and resistor 20, all of which form a summing circuit means. A D.C. position control 44 provides a vertical position correction output for adding or subtracting current to the summing junction 26 through a manually-operated, potentiometer-controlled voltage that is converted into a summing current by resistor 20. While the D.C. position control 44 may be manually adjusted, this adjustment is primarily used to effect a given parameter setting for the automatic position control. Vertical position correction output voltages are provided by position control 88, see FIGURE 2. These voltages pass through the potentiometer of the D.C. position control 44. Thus, the D.C. position control 44 may be selectively used as an overriding manual control or as a parameter setting device for increasing the range of the automatic positioning circuitry. The summing junction at 26 adds the voltage generated by the position control 88 and the D.C. position control 44 with the signal voltage output of the input attenuator 12, and this signal voltage is amplified by amplifier 27. The composite signal then appears on lines 11, 29 and 52.

The signal voltage on line 29 is amplified by an inverting amplifier means or a conventional inverting amplifier 30 that provides push-pull outputs of said input signal in positive and negative phase outputs. The signals on lines 31 and 32 are amplified by a conventional vertical amplifier 33 and supplied through lines 34 and 35 to the vertical deflection plates 16 and 17 of the cathode ray display tube 18. Electrostatic plates 16 and 17 vertically deflect the cathode ray tube electron beam in a manner proportional to the unknown signal input supplied to input line 10.

The signal voltage on line 11 feeds to the horizontal sweep circuit means through the trigger amplifier 13, which is a conventional amplifier. The output of the trigger amplifier 13 appears on line 21 and is supplied to the trigger circuit means or the trigger generator 22, which is a conventional generator having a shaping circuit whose output is a square wave 46. The frequency of this square wave 46 is the frequency of the unknown input signal. The triggering output waveform of the trigger generator appears on lines 36 and 55. The output on line 36 triggers the sweep generator and blanking control 24 producing a series of sawtooth voltage waveforms 50 on line 37. Along with the sawtooth waveform output, the sweep generator and blanking circuit 24 produces an unblanking signal waveform on line 45 having a square waveform 59. Point 57 of unblanking signal waveform 59 corresponds in time to point 51 of sweep speed waveform 50 and point 58 corresponds in time to point 48. The width of the sawtooth signal 51 and the unblanking signal waveform 59 is controlled by a sweep speed control 135, see FIGURE 3, in a manner that will be more specifically described hereinafter. The sweep generator and blanking control 24 may comprise conventional circuitry such as the vacuum tube sweep circuit shown in FIGURES 7–12, page 213 of "Pulse and Digital Circuits" in the "Electrical and Electronic Engineering Series" published in 1956 by McGraw and Hill and whose authors are Jacob Millman and Herbert Taub. The time based generator and blanking circuit in "Pulse and Digital Circuits" utilizes a conventional resistor and capacitor arrangement to control sweep speed and width of the gating signal to unblank the display cathode ray tube. Controlled banks of R.C. circuits may be selectively inserted into the time based generator and blanking circuit 24 via connecting line or lines 25 by conventional relay control in the sweep speed control 135. The relays of sweep control 135 are selectively energized by the output of the flip-flops in the horizontal sweep speed register 133.

The sawtooth wave output 50 of the sweep generator and blanking control 24 is supplied through line 37 to the conventional inverting amplifier 38 that provides positive and negatively phased push-pull signals through lines 39 and 40 to the horizontal output amplifier 41, which in turn drives the horizontal, electrostatic, deflection plates 19 and 9 via lines 42 and 43. The unblanking signal waveform on line 45 is amplified by the blanking signal amplifier 47 to the level of intensity of grid 49 of the cathode ray tube 18. This signal turns the cathode ray tube electron beam on and off by turning the beam on when the electron beam is sweeping across the face of the tube and turning it off for the remainder of the time. The electron beam would normally be on during the interval of time between points 57 and 58 of waveform 59. The unblanking signal amplifier 47 inverts waveform 59 before it is supplied to the grid 49 of the cathode ray tube 18.

Figure 2:
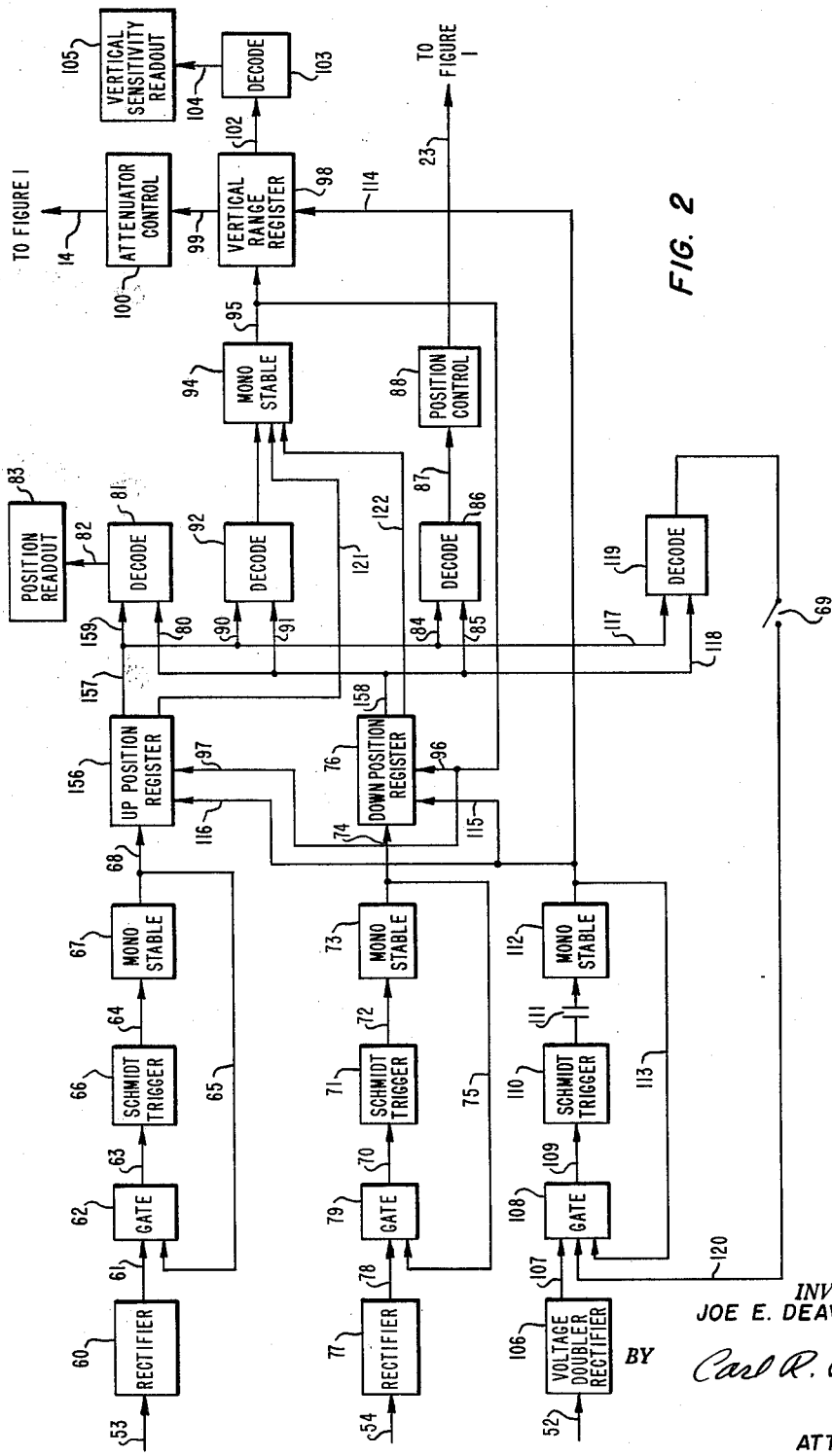
FIGURE 2 is a circuit diagram of the vertical control circuitry.

Referring now to FIGURE 2 that discloses the vertical detecting and correction circuit means, the positive signal appearing on line 53 from the inverting amplifier 30, see FIGURE 1, is rectified by rectifier 60, providing a D.C. signal output to line 61 having a level directly proportional to the most positive peak voltage of the signal waveform appearing in line 53. The rectifiers 60 and 77 may comprise conventional circuitry such as is shown in FIGURE 8, page 25 of Lawrence Baker Argurmbau's "Vacuum-Tube Circuits" published by John Wiley and Sons, Inc., New York, New York in 1948. The signal on line 61 is fed through gate 62 and line 63 to the Schmitt trigger circuit 66. Gates 62 and 79 are conventional or gate circuits that require a level on line 65 and 75 to pass a signal to the Schmitt triggers. When the voltage on line 63 reaches a sufficient, predetermined magnitude, the Schmitt trigger 66 will fire, providing an output on line 64 that fires the monostable flip-flop 67. The monostable flip-flop 67 then provides an output to feed back line 65 that inhibits the gate 62 from passing a signal to line 63 during the time delay of the monostable. The signal on line 65 closes gate 62 returning the Schmitt trigger 66 to its normal state and the Schmitt trigger 66 cannot thereafter be fired until the monostable 67, through its own time constant, has time to recover to its quiescent state. It may thus be seen that the first vertical detecting means from line 53 to 68 will, once the input voltage has reached a certain magnitude, provide first vertical output control signals the duration of which are determined by the time constant of monostable 67. The time constant of monostable 67 is of sufficient length that it will hold until all the necessary diodes, conversions, relays, etc. as hereinafter described, have had time to operate and a steady state condition in the circuitry is reached. Monostable 67 will then return to its normal state and if the signal appearing on line 53 is still of sufficient value to fire Schmitt trigger 66, then the Schmitt trigger 66 will again fire and the cycle will repeat. The output of monostable 67 is a pulse level on line 68 that places a count in the up position register 156 shifting the register one count.

The Schmitt triggers 66, 71 and 110 comprise the well known type of trigger circuit that was described in an article by O. H. Schmitt, entitled "A Thermionic Trigger Circuit" in the "Journal of Scientific Instruments," volume 15, pages 24 through 26, January 1938, and more recently in Sections 5–10 and 5–11 of "Pulse and Digital Circuits" in the "Electrical and Electronic Engineering Series," published in 1956 by McGraw and Hill and whose authors are Jacob Millman and Herbert Taub. A specific Schmitt trigger circuit that may be used is shown in FIGURE 5–21 in the aforesaid "Pulse and Digital Circuits." The monostable flip-flops 67, 73 and 112 are of conventional and well known design and may be of the type shown in FIGURE 6–1, page 175 of "Pulse and Digital Circuits."

When a signal of opposite polarity is supplied to line 54, such as a positive signal corresponding to moving the electron beam in a vertical direction downwardly on the face of the cathode ray tube, the second vertical detecting means from lines 54 to 74, see FIGURE 2, function in the same manner as that previously described relative to the circuitry from lines 53 to 68. The pulse levels of monostable 73 drive the down position register 76 in a manner previously described relative to the up position register 156.

The output signal reflecting the count of the up position register 156 is supplied by lines 157 and 159 to the decode 81, as is the output of the down position register 76 through lines 158 and 80. Decode 81 decodes the signal information on lines or groups of lines 159 and lines or groups of lines 80, as signals may exist on these lines, and provides an output signal to the position readout 83 via line 82. Position readout 83 informs the operator of the oscilloscope about the amount of D.C. offset used in effecting automatic position control of the display on the tube screen. The circuit arrangement is such that counts do not exist simultaneously in the up position and down position registers. Thus decode 81 and position readout 83 only reflect a D.C. offset in one direction or the other at any one time. The outputs of the up position register 156 and down position register 76 also feed into the decode 86 via lines 84 and 85 with the output of decode 86 through line 87 driving the position control 88. Position control 88 may comprise a conventional bank of conventionally arranged relays controlling appropriately valued resistors, that in turn generate a voltage corresponding to centimeters of deflection on the face of the display tube. The vertical position correction output on line 23 is supplied through the D.C. position control 44 and resistor 20 to the summing junction 26. The over-all operation is such that as counts are put into the position register 156 voltages are generated in the position control 88 that will move the electron beam down on the face of the display tube 1 centimeter per count in the up position register. Counts in the down position register 76 will move the beam up the same given centimeters on the face of the display tube.

As previously stated, it is not desirable to simultaneously have counts in both the up position register 156 and the down position register 76 during steady state conditions, since only one of the position register outputs may position the beam on the face of the cathode ray tube 18. Thus the up position register 156 and the down position register 76 also provide outputs reflecting their counts through lines 90 and 91 to decode 92. Decode 92, which may be an "and" gate, provides an output pulse, when counts appear in both registers simultaneously, to the monostable 94. Monostable 94 then fires placing a count in the vertical range register 98 via line 95 and in turn through lines 96 and 97 provide position reset pulses to the up position register 156 and the down position register 76 resetting these position registers to zero count positions. The attenuating output signal of vertical range register 98 is supplied through line 99 to attenuator control 100, which in turn provides an attenuating signal through line 14 to the input attenuator 12. To provide the operator with information concerning the level of attenuation, the output count of the vertical range register 98 also feeds through line 102 to decode 103 that in turn converts this information signal to an output pulse that appropriately drives the readout 105 giving the operator the amount of sensitivity of the vertical attenuation. Display can be by nixie tube or neon tube readout, for example.

A down range generator means includes a gate 108, a Schmitt trigger 110 and a monostable flip-flop 112 that functions in combination in somewhat the same manner as previously described relative to the up and down position registers. An input signal is continuously provided by amplifier 27 of FIGURE 1 through line 52 to the voltage doubling rectifier 106, that in turn provides a D.C. voltage output proportional to the peak to peak value of the input voltage. This D.C. output voltage on line 107 passes through gate 108 and line 109 to the Schmitt trigger 110, holding trigger 110 in a given "on" state so long as the signal level from voltage doubler 106 is above a given magnitude. Should the voltage level fall below the given magnitude, then the Schmitt trigger will change its state providing a change output pulse that passes through capacitor 111 providing a spike that trips monostable 112. The output of the energized monostable 112 feeds through lines 114, 115 and 116, resetting to zero count the vertical range register and the up and down position registers. The voltage doubling rectifier 106 may comprise a conventional circuit such as the cascade doubler circuit shown in FIGURES 11-6, page 553 of "Radio Engineering," which is a part of the "Electrical and Electronic Enginering Series," published by McGraw and Hill, 3rd Edition, in 1957. The author of "Radio Engineering" is Terman. The output level of monostable 112 through feedback circuit 113 and gate 108, is of sufficient magnitude to hold trigger 110 in its previously described given condition. An additional lockout circuit is provided that when energized provides a level through line 120 holding Schmitt trigger 110 to the given condition or state. When either the up position register 156 or the down position register 76 achieves a count of a given number, that may be arbitrarily set, such as a count of three, the register receiving the given count will provide an output level through either lines 117 or 118 to decode 119, which may be an "or" gate, that in turn provides an output level to line 120.

Figure 3:
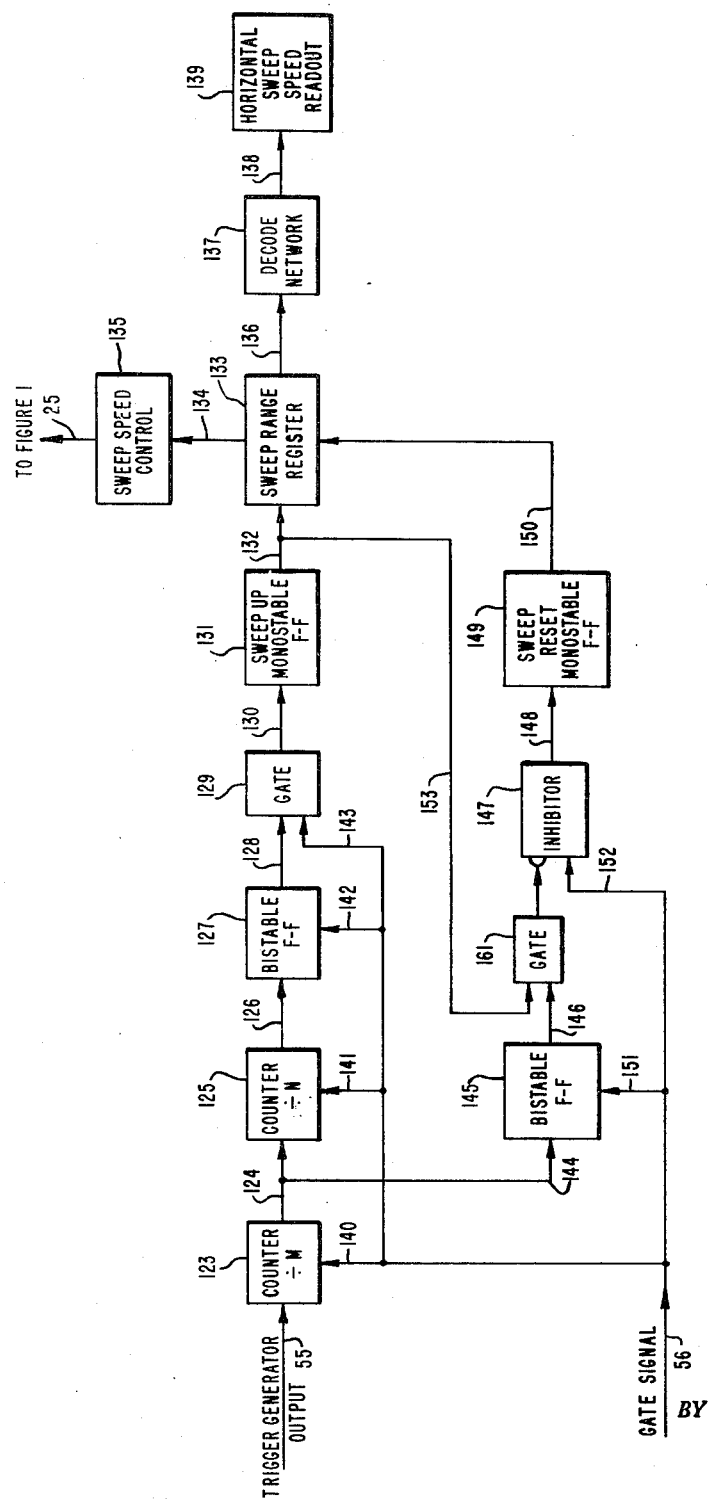
FIGURE 3 is a circuit diagram of the horizontal sweep speed control circuitry.

Referring now to FIGURE 3, the trigger output waveform 46 feeds through line 55 to the first divider counter means or binary counter 123. Counter 123 utilizes a conventional divider circuit that divides the number of square wave cycles received in waveform 46 by "M." Thus, for example in this case, if "M" were 2, then for every two cycles appearing in line 55, one cycle output would appear on lines 124 to counter 125. Counter 123 is a conventionally coupled binary with M/2 number of stages. The output cycle on line 124 in turn triggers second divider counter means 125 that counts the cycles and divides the number of cycles by an "N" number. "N" in this case may equal 3. Thus, for 6 cycles appearing on line 55 there will be 3 cycles appearing on line 124 and 1 cycle output on line 126 to the bi-stable flip-flop 127. The firing or changing the condition of bi-stable flip-flop 127 sends a pulse through gate 129 to the sweep-up monostable flip-flop 131 which provides an output count to the sweep range register 133. Counter 123 and counter 125 along with bi-stable flip-flop 127 are all controlled by the gate signal 59 received via lines 56, 140, 141, 142 and 143 respectively. The gate signal 59 resets the counters 123 and 125 and the bi-stable flip-flop 127 so that they are in a zero or initial state at the start of the sweep of the electron beam across the display tube screen. This is the beginning of the "on" time for the gate signal 59. The counters will then commence counting the cycles in waveform 46 from a zero count. After six cycles have occurred, the output of counter 123 driving counter 125 will, in turn, fire bi-stable flip-flop 127. Bi-stable flip-flop 127 then supplies an output signal through the gate 129 to fire the monostable flip-flop 131. Gate 129 is thus controlled by the gate signal 59 and the sweep up monostable 131 can be fired only during the gate on time. If less than six cycles occur during the entire gate on time, the sweep up monostable 131 will not be fired. At the end of the gate on time, both counters 123 and 124 and the bi-stable flip-flop 127 are reset and held in their so-called "off" condition awaiting the start of the next gate on and sweep signal. Should more than six cycles occur during the gate on time, the sweep up monostable flip-flop 131 places a count in the sweep range register 133 for each six cycles in waveform 46. The sweep range register 133 counts up one range faster for each count received from the sweep up monostable 131 so that the sweep speed is increased resulting in less cycles appearing on the screen of the display tube. The count in the sweep range register 133 operates relays in the sweep speed control 135 that provides a control voltage through line or lines 25 to the sweep generator and blanking control circuit 24 that increases the sweep speed output of the sweep generator 24 as previously described. The output of the sweep range register 133 is also supplied to the decode network 137 and onto readout 139, that displays the horizontal sweep speed. Sweep up monostable 131 has a hold delay time that is sufficiently long to allow the relays of the sweep control 135 to operate and move from their original position to their new position.

The output of the first divider counter means 123 is also supplied to bi-stable flip-flop 145 via line 144. Thus the position of this flip-flop is changed when two cycles of the trigger generator output occur on line 55 during gate on time. The output of bi-stable flip-flop 145 is supplied via line 146 through or gate 161, through the inhibitor gate 147 to the sweep reset monostable flip-flop 149. Conditions for inhibitor gate 147 are that at the beginning of the gate "on" time, bi-stable flip-flop 145 is zeroed by the gating signal on line 151. At the end of the gate "on" time, the gate signal appearing on line 152 returns to its off condition. Should the bi-stable flip-flop 145 at the end of the gate on time not have received a pulse on line 144 and thus no pulse-level exists on line 146, then the dropping of the level on line 152 will pass a change pulse through inhibitor gate 147 on line 148 to the sweep reset monostable 149 energizing the monostable; however, should two cycles occur, the bi-stable flip-flop 145 will then be energized and the gate 147 will be inhibited and will not pass a pulse to monostable 149 during the dropping of the level of the gate on signal. An interlock is also provided between the sweep up monostable 131 and gate 147 that inhibits gate 147 from passing a signal pulse via line 152 to the sweep reset monostable 149 when the sweep up monostable 131 is energized. This allows for the relay switching time necessary in operation of the sweep speed control 135. Thus a subsequent signal during a subsequent gate on time cannot energize sweep reset monostable 149 and reset the sweep range register 133 at a time when the sweep speed control 135 is increasing the speed of the sweep. The sweep range register 133 also has a conventional interlock circuit that, when receiving a reset pulse from line 150, will not accept any input pulses occurring on line 132. Both monostables 131 and 149 have sufficient time delays to allow for the normal switching time of the relays of sweep speed control 135. Thus, if less than two cycles of input signals appear on the display screen during one sweep time interval, the sweep speed is too fast and the sweep range register 133 will, via the signal on line 150, be reset to its zero state, which is the slowest possible sweep speed.

Relating now to the operation of the oscilloscope control circuitry, an input signal having a waveform to be displayed on the screen of the cathode ray tube is supplied by line 10 to the input attenuator 12. The signal is then amplified by amplifiers 27 and the inverting amplifier 30, providing a push-pull signal that is in turn amplified by vertical amplifier 33 providing a driving signal to the plates of the cathode ray tube 18. This driving signal should give the desired vertical displacement of the waveform on the cathode ray screen. For example, in a five inch cathode ray tube, a three centimeter deflection from the centerline is considered to be the maximum usable deflection. Should an incoming signal have a magnitude that, when amplified as previously described, will provide a deflection on a cathode ray tube greater than three centimeter from the centerline, then the signal must be attenuated to an extent that will provide the correct magnitude of signal giving the desired approximate three centimeters deflection. Also, the signal may have a frequency that when supplied to the trigger amplifier 13 and the trigger generator 22 will provide a sweep signal 50 having a time constant that displays an excessive number of cycles of the signal horizontally across the screen of the cathode ray tube. This would be undesirable. Further, the signal may have a frequency so slow that, because of a previous setting of the automatic circuitry, only a portion of a cycle of the signal will be displayed on the screen of the cathode ray tube. Thus, the sweep speed will have to be appropriately increased so that a desired number of cycles will be displayed on the screen of the tube. Generally the number of cycles in an acceptable display should fall within the range of two to six cycles.

It may thus be seen that the first function of the automatic circuitry is to detect in what manner the signal is being displayed on the screen of the cathode ray tube. This is accomplished by detecting the levels of the signals within the circuitry of the oscilloscope control circuitry to determine whether the signals are such that they will afford the correct and desired displays on the screen of the tube. The signal on line 52 of FIGURE 1, that is received by the down range circuitry of FIGURE 2, detects whether the peak to peak level of the signal amplified by amplifier 27 has the minimum degree of voltage level required to provide a deflection on a screen of the cathode ray tube exceeding two centimeters. The vertical detecting circuit means electrically connected to lines 53 and 54 respectively, detect the magnitude of the voltage level in the positive and negative phases of the input signal to determine whether these levels have a magnitude greater than that which will deflect the electron beam a distance of approximately 3 centimeters vertically up and down from the center of the cathode ray tube. Accordingly, to gauge the magnitudes of the voltages causing the vertical deflection of the electron beams, pick-off voltages on lines 53 and 54 are processed by the vertical detecting and correction circuit means in FIGURE 2. These voltages are used to develop control voltages that are reinserted as vertical correction signals into the circuitry of FIGURE 1, through lines 14 and 23 to control the attenuation of input attenuator 12 and to control the vertical positioning control 88. These two controls vertically position the electron beam relative to the screen of the cathode ray tube.

In the horizontal sweep circuit means, line 55 carries the triggering output waveform 46 and line 56 the unblanking signal waveform 59 to the circuitry of FIGURE 3, which circuitry detects the range of number of cycles occurring in the input signal relative to the sweep speed output of the sweep generator blanking control 24. Should the number of cycles being displayed exceed six cycles, then the circuitry of FIGURE 3 will provide a change in the sweep speed control 135 that increases the sweep speed output of the sweep generator and blanking control 24. Should the speed of the sweep be so rapid that at least two cycles are not displayed on the screen of the cathode ray tube, the circuitry of FIGURE 3 will then decrease the sweep speed output of the sweep generator and blanking control 24 through the sweep speed control circuitry 135 via line 25.

It may be assumed for this operational description that if the electron beam is in the center of the cathode ray tube screen the voltages at points 52, 53 and 54 are at zero potential. Should the beam move to the limit of the display screen, for this description a three centimeters deflection, then the voltages at point 53 or 54 will be three volts. The input signal on line 10 may comprise one of three forms. It may be a D.C. signal, it may be an A.C. signal—that is, an A.C. signal with no D.C. component; or it may be a composite D.C. voltage with an A.C. signal superimposed thereon. The automatic circuitry previously described will correctly display each of these signals. Now assuming the input signal is a very slow sign wave of relatively large amplitude. The initial condition of the input attenuator 12 is at its lowest attenuation, i.e. its output is equal to its input. As the input signal gradually goes from zero voltage to its positive peak voltage, the voltage at point 53 progressively increases. It will continue to increase until its level is sufficient to cause the Schmitt trigger 66, see FIGURE 2, to fire which in turn fires the monostable 67. This places a count in the up position register 156, which was initially at a count of zero. This count in the up position register 156 places a one count level into decode 86 that adds current to the summing junction 26 through position control 88 amounting to a one centimeter deflection downwardly of the electron beam in the vertical direction on the cathode ray tube display screen. This will pull the electron beam downwardly toward the center of the tube and display through position readout 83 that the D.C. position control is now one centimeter off center in a vertical downward direction. While the input signal is still of much greater magnitude than that which can be adequately displayed on the cathode ray tube, the level on line 53 will continue to increase subsequent to the firing of the Schmitt trigger 66. However, unless the frequency of the signal is quite slow, the time delay of monostable 67 will not permit the Schmitt trigger 66 to again fire during the cycle because of the feedback circuit 65 inhibiting gate 62 until after the level of the input signal has dropped from the positive to the negative phase. However, assuming that the signal was so slow that the monostable 67 is able to reach a quiescent stage while the positive phase is still at a large magnitude, then Schmitt trigger 66 would again fire and would place a second succeeding pulse into the up position register 156 through monostable 67 causing an additional position control current to be added to the summing junction and would cause an additional one centimeter deflection downwardly. When the signal enters the negative phase, it will continue to go negative until the positive voltage caused by the inverting amplifier 30 on line 54 is sufficient in amplitude to fire the Schmitt trigger 71, which in turn fires monostable 73 placing a count in the down position register 76. At this point we will now have a count in both the up position register 156 and the down position register 76. The two registers provide output pulses on lines 90 and 91 to decode 92 that upon this coincidence fires monostable 94 placing a count in the vertical range register 98. The output of monostable 94 also through feedback lines 96 and 97 clears the counts of the up position register 156 and the down position register 76. The vertical range register 98 places a one count level in the attenuator control 100 that, in turn, through its relay control, inserts an additional attenuator R.C. circuit into the input attenuator 12 advancing it to the first attenuating point, which for point of example, may be an attenuation of two. Thus, the signal having a magnitude in the positive and negative directions exceeding the display capability of the cathode ray tube has caused the attenuation of the signal in both the positive and negative phases. This process will continue by placing more counts in both the up position and down position registers and, in turn, in the vertical range register 98 until such time as the attenuation of the input attenuator 12 is sufficient to reduce the magnitude of the input signal in the positive and negative directions to a degree that the signal will be displayed within plus or minus three centimeters deflection on the screen of the cathode ray tube. At such a point the amplitudes of voltages on lines 53 and 54 would not be sufficient to fire either Schmitt triggers 66 or Schmitt triggers 67. The amount of the attenuation will be displayed on the outside of the oscilloscope by the readout device 105.

When receiving a relatively small A.C. signal that has a large D.C. offset, the composite input signal generates an output signal on either line 53 or line 54 causing only one of the Schmitt triggers 66 or 71 to fire. If the D.C. offset is a positive direct current, then the electron beam would be deflected off the screen in a vertical upward direction on the cathode ray tube screen and the voltage level in line 53 would be excessive causing Schmitt trigger 66 to fire repeatedly, putting several counts into the up position register 156. This will cause repeated increases in the positioning current of positioning control 88 to the summing junction 26 and will eventually drop the electron beam vertically downwardly until the A.C. signal is appropriately displayed within plus or minus three centimeters. The count required in the up position counter to offset this large D.C. offset will be decoded by the position decoder 83 and displayed on a readout position indicator on the oscilloscope showing how many centimeters off the center of the cathode ray tube screen the actual ground point is. Should the D.C. offset be of sufficient magnitude that the counts in the up position register 156 exceed the permissible count in the register, then the register will provide an output through line 121 to the monostable 94 that, in turn, provides one count into the vertical range register 98 and a reset pulse to reset the up position register 156. In response, the attenuator control 100 increases the attenuation of the input attenuator 12. This reduces the magnitude of the signal, thus permitting the counts in the up position register to be within the parameters of the permissible counts of the register.

The description of the operation has thus far been directed to handling input signals of excessive magnitude. Often, however, after a large signal has been displayed and vertical range attenuation was applied to the attenuator 12, a smaller input signal will then be received. Because of the attenuation of the previous signal, the new signal's voltage magnitude, when amplified by the amplification stages, will not be large enough to present a satisfactory display on the screen. That is, the display will not be at least a deflection of two centimeters on the face of the tube. In this situation, the peak to peak output of the voltage on line 52 of amplifier 27 will not be of a magnitude to hold the Schmitt trigger 110 of the down range circuitry in FIGURE 2, in its given state. Thus the trigger 110 will change its state sending an output pulse firing monostable 112. This provides a reset pulse to the vertical range register 98 that returns the vertical range register to zero count removing all attenuation of an input signal by input attenuater 12. This also resets the up position and down position registers returning the entire system to the zero condition. Counts may then be built up in the up position and down position registers and the vertical range registers until the proper sensitivity is reached.

A D.C. signal with no A.C. signal superimposed thereon may be brought within the sensitivity of the display tube in the same manner as previously described relative to the A.C. signal impressed upon the D.C. offset. Where the input signal is of pure D.C. of an amplitude sufficient to drive the up position register to a point exceeding its capacity, then once this capacity is reached the output of this register appearing on line 121 will fire monostable 94 that in turn will decrease the sensitivity by adding a count in the vertical range register 98. Assuming the amplitude of the D.C. signal is such that this might happen several times, this condition could result in a D.C. signal of less than two centimeters deflection and thus monostable 112 of the down range circuit would fire, resetting the vertical range register 98. To avert the possibility of an oscillation condition occurring by the D.C. component tending to put counts in the vertical register, and the lack of an A.C. signal tending to fire monostable 112 causing resetting of the vertical range register, decode 119 will respond and provide an output signal through gate 108 of sufficient magnitude to hold the Schmitt trigger 110 in its given condition at any time that the up position register 156 or down position register 76 carries a predetermined count, such as a count of three. Thus it may be seen that the automatic circuitry will accommodate both the straight D.C. signal as well as an A.C. signal. Should the input to the oscilloscope be capacitively coupled, thus eliminating any D.C. component to the signal and only A.C. components are displayed, the output of the decode 119 may be disconnected through switch 69.

In operation of the horizontal sweep control section, a relatively high frequency input signal is received. The sweep speed controlling waveforms 50 and 59 are of such a time duration that an excessive number of cycles of the input signal, more than six, is displayed. The square wave output of the trigger generator 22 thus has a relatively large frequency and causes counter 123 to provide several counts to counter 125. Counter 123 will provide an output for every second count received by the counter while the counter 125 will provide an output for every third count received by counter 125. Since the number of cycles during the gate "on" time period exceeds six, which is the time period between points 51 and 48 of waveform 50, and 57 and 58 of waveform 59 and corresponds to the sweeping time of the beam across the screen of the cathode ray tube, bi-stable flip-flop 127 will be fired. If the frequency is very large, then the bi-stable may change its condition several times during the gate "on" signal period. This will cause the up sweep monostable flip-flop 131, within its time delay requirements, to provide successive output pulses to the sweep range register 133, causing successive increases in the output to the sweep speed control 135 and, consequently, a series of increases in the speed of the sweep speed output of the sweep generator and blanking control 24. As may be seen, within the range limits of the sweep generator and blanking control 24 there will be provided a sawtooth wave 50 having a sweep speed sufficient to display less than six cycles of the input signal.

The output of the trigger generator appearing on line 55 is as previously stated a square wave representation of the unknown input signal, i.e. sign wave frequency of a frequency "$f$" or complex wave of fundamental frequency "$f$," and will appear as a square wave or unbalanced square wave of fundamental frequency "$f$" on line 55. Thus, for one fundamental cycle of the input signal, regardless of the general waveform, there will be one fundamental cycle on line 55 having a substantially square wave. Where a high frequency input signal is displayed and a subsequent input signal has a relatively low frequency, the sweep speed output of sweep generator and blanking control 24 will be so rapid that only a portion of the input signal is displayed during one sweep of the electron beam across the screen of the cathode ray tube. In this situation, counter 123 would not receive two counts and bi-stable flip-flop 145 would not change its condition during the gate "on" time interval. This will allow gate 161 to pass a signal to the sweep reset monostable flip-flop 149 on the termination of the gate "on" signal. The output of monostable 149 then provides a reset pulse to the sweep range register 133 resetting the register 133 to its initial "no count" condition. The sweep generator and blanking control 24 is then returned to its slowest sweep speed condition by sweep speed control 135. Should the frequency of the signal 46 exceed the slowest sweep speed of sweep generator and blanking control output 24 so that more than six cycles are displayed, then the sweep speed can be speeded up in the manner previously described.

In the description of the specific embodiment, relays have been used because of their simplicity and acceptance in conventional circuits. However, it should be noted that other types of switches may be used, such as transistorized switches. Also, it may be seen that the sweep range register readout 139 may be modified to provide a number of different types of displays. In the particular operation of the embodiment described in this specification, the automatic sweep circuit automatically provides display of a given number or range of repetitive waveforms. This number of range may be selectively changed, within this invention, to display a single cycle or a portion of a cycle, by adjusting the parameters of the circuit.

While I have shown and described a specific embodiment of my invention, other modifications will readily occur to those skilled in the art. I do not, therefore, desire my invention to be limited to the specific arrangement shown and described.

I claim:

1. In an oscilloscope for displaying the waveforms of a plurality of input signals having different magnitudes and frequencies,
   vertical deflection circuitry means for selectively increasing and decreasing said magnitudes of said input signals providing vertical deflection output signals to said oscilloscope,
   vertical detecting circuit means for detecting said magnitudes of said input signals and providing vertical output signals when said magnitudes of said input signals are outside a given range of magnitudes,
   vertical correction circuit means being responsive to said vertical output signals for providing vertical correction signals to said vertical deflection circuitry means that selectively increase or decrease said magnitudes of said input signals in said vertical deflection circuitry means bringing said magnitudes within said given range of magnitudes,
   horizontal sweep circuit means being responsive to said input signals for providing horizontal sweep control voltages having selected sweep speeds to said oscilloscope,
   horizontal detecting circuit means for detecting said sweep speeds of said horizontal sweep control voltages and said frequencies of said input signals and for providing horizontal output signals when the number of cycles of said input signals occurring during a given sweep are outside a given range of cycles,
   horizontal correction circuit means responsive to said horizontal output signals for providing horizontal correcting voltages to said horizontal sweep circuit means adjusting the sweep speed of said horizontal sweep control voltage to a given sweep speed in which the number of cycles of said input signal occurring during said given sweep speed are within said given range of cycles.

2. In an oscilloscope for displaying the waveforms of a plurality of input signals having different frequencies,
   horizontal sweep circuit means being responsive to said input signals for providing horizontal sweep control voltages having selected sweep speeds to said oscilloscope,
   horizontal detecting circuit means for detecting said sweep speeds of said horizontal sweep control voltages and said frequencies of said input signals and for providing horizontal output signals when the number of cycles of said input signals occurring during a given sweep are outside a given range of cycles,
   and horizontal correction circuit means responsive to said horizontal output signals for providing horizontal correcting voltages to said horizontal sweep circuit means adjusting the sweep speed of said horizontal sweep control voltage to a given sweep speed in which the number of cycles of said input signals occurring during said given sweep speed are within said given range of cycles.

3. In an oscilloscope for displaying the waveforms of a plurality of input signals having different magnitudes,
   vertical deflection circuitry means for selectively increasing and decreasing said magnitudes of said input signals providing vertical deflection output signals to said oscilloscope,
   vertical detecting circuit means for detecting said magnitudes of said input signals and providing vertical output signals when said magnitudes of said input signals are outside a given range of magnitudes,
   and vertical correction circuitry means being responsive to said vertical output signals for providing vertical correction signals to said vertical deflection circuitry means that selectively increase or decrease said magnitudes of said input signals in said vertical deflection circuitry means bringing said magnitudes within said given range of magnitudes.

4. In an oscilloscope for displaying the waveform of a plurality of input signals that may have different phases, magnitudes and frequencies,
   attenuating means for receiving said input signals, and providing selectively attenuating signal outputs in response to attenuating control signals,
   summing circuit means for summing said attenuating signal outputs with vertical position correction outputs in the positive and negative phases and providing summing circuit output,
   inverting amplifier means for amplifying said summing circuit output providing push-pull outputs in the positive and negative phases of said input signal,
   first vertical detecting means responsive to said push-pull outputs of said input signal in said positive phase for detecting and providing first vertical output control signals when said push-pull outputs in said positive phase exceed a given magnitude, up position register means for counting said first vertical output control signals and providing up position output signals reflecting said count, second vertical detecting means responsive to said push-pull outputs of said input signal in said negative phase for detecting and providing a series of second vertical output control signals when said push-pull outputs in said negative phase reoccurringly exceeds a given magnitude, down position register means for counting said second vertical output control signals and providing down position output signals reflecting said count, position decode and readout means responsive to said up position output signals and said down position output signals for displaying the number of counts in said up position register means and said down position register means, vertical position correction means responsive to said up position output signals for providing said vertical position correction output in the positive phase having a magnitude proportional to the count in said up position register to said summing circuit means, said vertical position correction means being responsive to said down position output signals for providing said vertical position correction output in the negative phase having a magnitude proportional to the count in said down position register to said summing circuit means, vertical range register means for receiving and sensing the simultaneous occurrence of said up position output signals and said down position output signals providing output signals and attenuating control signals to said attenuating means, vertical sensitivity decode and readout means responsive to said output signals of said vertical range register means for displaying the number of counts in said vertical range register means, said vertical range register means having position reset means for sensing the simultaneous occurrence of counts in said up position register means and said down position register means and providing position reset pulses to said up and down position register means, down range generator means responsive to said summing circuit output for detecting and providing a vertical range register reset pulse to said vertical range register when said summing circuit output is below a given magnitude, said vertical range register being reset by said vertical range register reset pulse, down range register interlock means responsive to said up position output signals and said down position output signals reflecting a given count in said up or down position registers for providing a down range inhibiting signal inhibiting said down range generator means from providing said vertical range register reset pulse, said push-pull outputs controlling the vertical display of said oscilloscope, trigger circuit means responsive to said summing circuit output providing a triggering output waveform having a frequency proportional to the frequency of said input signal, sweep generator means for providing a sweep speed control waveform that controls the sweep speed of the horizontal display of said oscilloscope and the unblanking signal waveform that controls the display of said oscilloscope, said sweep speed control waveform and said unblanking signal waveform having given synchronized speeds, said sweep generator means being triggered by said triggering output waveform, first divider counter means for receiving said triggering output waveform and counting the cycles in said triggering output waveform providing a first divider counter output pulse for each occurrence of receiving a given minimum number of cycles of said triggering output waveform during the time said first divider counter means is energized, second divider counter means for receiving and counting said first divider counter output pulses and providing a second divider counter output pulse for each occurrence of receiving a given number of said first divider output pulses, sweep-up means being energized by said second divider counter output pulse for providing a sweep-up output pulse, sweep range register means for counting said sweep-up output pulses and providing a horizontal correcting signal output to said sweep generator means reflecting the number of said sweep-up output pulses, horizontal sweep speed decode and readout means responsive to said output of said sweep range register means for displaying the number of counts in said sweep range register means, said unblanking signal waveform being supplied to said first and second divider counter means for energizing said counter means during the sweep time of the horizontal display and resetting said counters at the termination of said sweep time, minimum count means in response to said first divider counter output pulses and said unblanking signal waveform providing an output pulse at the end of said sweep time cycle of said unblanking signal waveform upon the absence of a first divider counter output pulse during said sweep wave cycle, said output pulse of said minimum count means resetting said sweep range register means to a zero count, and the speed of said sweep speed control waveform being controlled by said horizontal correcting signal being impressed on said sweep generator means.

5. In an oscilloscope for displaying the waveform of a plurality of input signals that may have different phases, magnitudes and frequencies, attenuating means for receiving said input signals and providing selectively attenuating signal outputs in response to attenuating control signals, summing circuit means for summing said attenuating signal outputs with vertical position correction outputs in the positive and negative phases and providing summing circuit outputs, inverting amplifier means for amplifying said summing circuit output providing push-pull outputs in the positive and negative phases of said input signal, first vertical detecting means responsive to said push-pull outputs of said input signal in said positive phase for detecting and providing a series of first vertical output control signals when said push-pull outputs in said positive phase reoccurringly exceeds a given magnitude, up position register means for counting said first vertical output control signals and providing up position output signals reflecting said count, second vertical detecting means responsive to said push-pull outputs of said input signal in said negative phase for detecting and providing a series of second vertical output control signals when said push-pull outputs in said negative phase reoccurringly exceeds a given magnitude, down position register means for counting said second vertical output control signals and providing down position output signals reflecting said count, vertical position correction means responsive to said up position output signals for providing said vertical position correction output in the positive phase having a magnitude proportional to the count in said up position register to said summing circuit means, said vertical position correction means being responsive to said down position output signals for providing said vertical position correction output in the negative phase having a magnitude proportional to the count in said down position register to said summing circuit means, vertical range register means for receiving and sensing the simultaneous occurrence of said up position output signals and said down position output signals reflecting the simultaneous occurrence of counts in said up position register means and said down position register means and in response to said occurrence providing output signal and attenuating control signals to said attenuating means, said vertical range register means having position reset means responsive to said output of said vertical range register means for providing position reset pulses to said up and down position register means, down range generator means responsive to said summing circuit output for detecting and providing a vertical range register reset pulse to said vertical range register when said summing circuit output is below a given magnitude, said vertical range register being reset by said vertical range register reset pulse, down range register interlock means responsive to said up position output signals and said down position output signals reflecting a given count in said up or down position registers for providing a down range inhibiting signal inhibiting said down range generator means from providing said vertical range register reset pulse, said push-pull outputs controlling the vertical display of said oscilloscope, trigger circuit means responsive to said input signals for providing a triggering output waveform having a frequency proportional to the frequency of said input signal, sweep generator means for providing a sweep speed control waveform that controls the sweep speed of the horizontal display of said oscilloscope and the unblanking signal waveform that controls the display of said oscilloscope, said sweep speed control waveform and said unblanking signal waveform having given synchronized speeds, said sweep generator means being triggered by said triggering output waveform, first divider counter means for receiving said triggering output waveform and counting the cycles in said triggering output waveform providing a first divider counter output pulse for each occurrence of receiving a given minimum number of cycles of said triggering output waveform during the time said first divider counter means is energized, second divider counter means for receiving and counting said first divider counter output pulses and providing a second divider counter output pulse for each occurrence of receiving a given number of said first divider output pulses, sweep-up means being energized by said second divider counter output pulse for providing a sweep-up output pulse, sweep range register means for counting said sweep-up output pulses and providing a horizontal correcting signal output to said sweep generator means reflecting the number of said sweep-up output pulses, said unblanking signal waveform being supplied to said first and second divider counter means for energizing said counter means during the sweep time of the horizontal display and resetting said counters at the termination of said sweep time, minimum count means in response to said first divider counter output pulses and said unblanking signal waveform for providing an output pulse at the end of said sweep time cycle of said unblanking signal waveform upon the absence of a first divider counter output pulse during said sweep wave cycle, said output pulse of said minimum count means resetting said sweep range register means to a zero count, and the speed of said sweep speed control waveform being controlled by said horizontal correcting signal being impressed on said sweep generator means.

6. In an oscilloscope for displaying the waveform of a plurality of input signals that may have different phases, magnitudes and frequencies, attenuating means for receiving said input signals and providing selectively attenuated signal outputs in response to attenuating control signals, summing circuit means for summing said attenuating signal outputs with vertical position correction outputs in the positive and negative phases and providing summing circuit outputs, inverting amplifier means for amplifying said summing circuit output providing push-pull outputs in the positive and negative phases of said input signal, first vertical detecting means responsive to said push-pull outputs of said input signal in said positive phase for detecting and providing a series of first vertical output control signals when said push-pull outputs in said positive phase reoccurringly exceeds a given magnitude, up position register means for counting said first vertical output control signals and providing up position output signals reflecting said count, second vertical detecting means responsive to said push-pull outputs of said input signal in said negative phase for detecting and providing a series of second vertical output control signals when said push-pull outputs in said negative phase reoccurringly exceeds a given magnitude, down position register means for counting said second vertical output control signals and providing down position output signals reflecting said count, position decode and readout means responsive to said up position output signals and said down position output signals for displaying the number of counts in said up position register means and said down position register means, vertical position correction means responsive to said up position output signals for providing said vertical position correction output in the positive phase having a magnitude proportional to the count in said up position register to said summing circuit means, said vertical position correction means being responsive to said down position output signals for providing said vertical position correction output in the negative phase having a magnitude proportional to the count in said down position register to said summing circuit means, vertical range register means for receiving and sensing the simultaneous occurrence of said up position output signals and said down position output signals reflecting the simultaneous occurrence of counts in said up position register means and said down position register means and in response to said occurrence providing output signal and attenuating control signals to said attenuating means, vertical sensitivity decode and readout means responsive to said output signals of said vertical range register means for displaying the number of counts in said vertical range register means, position reset means for sensing the simultaneous occurrence of counts in said up position register means and said down position register means and providing position reset pulses to said up and down position register means, down range generator means responsive to said summing circuit output for detecting and providing a vertical range register reset pulse to said vertical range register when said summing circuit output is below a given magnitude, said vertical range register being reset by said vertical range register reset pulse, down range register interlock means responsive to said up position output signals and said down position output signals reflecting a given count in said up or down position registers for providing a down range inhibiting signal inhibiting said down range generator means from providing said vertical range register reset pulse, said push-pull outputs controlling the vertical display of said oscilloscope, trigger circuit means responsive to said input signals for providing a triggering output waveform having a frequency proportional to the frequency of said input signal, sweep generator means for providing a sweep speed control waveform that controls the sweep speed of the horizontal display of said oscilloscope and the unblanking signal waveform that controls the display of said oscilloscope, said sweep speed control waveform and said unblanking signal waveform having given synchronized speeds, said sweep generator means being triggered by said triggering output waveform, first divider counter means for receiving said triggering output waveform and counting the cycles in said triggering output waveform providing a first divider counter output pulse for each occurrence of receiving a given minimum number of cycles of said triggering output waveform during the time said first divider counter means is energized, second divider counter means for receiving and counting said first divider counter output pulses and providing a second divider counter output pulse for each occurrence of receiving a given number of said first divider output pulses, sweep-up means being energized by said second divider counter output pulse for providing a sweep-up output pulse, sweep range register means for counting said sweep-up output pulses and providing a horizontal correcting signal output to said sweep generator means reflecting the number of said sweep-up output pulses, horizontal sweep speed decode and readout means responsive to said output of said sweep range register means for displaying the number of counts in said sweep range register means, said unblanking signal waveform being supplied to said first and second divider counter means for energizing said counter means during the sweep time of the horizontal display and resetting said counters at the termination of said sweep time, minimum count means in response to said first divider counter output pulses and said unblanking signal waveform for providing an output pulse at the end of said sweep time cycle of said unblanking signal waveform upon the absence of a first divider counter output pulse during said sweep wave cycle, said output pulse of said minimum count means resetting said sweep range register means to a zero count, and the speed of said sweep speed control waveform being controlled by said horizontal correcting signal being impressed on said sweep generator means.

7. In an oscilloscope for displaying the waveform of a plurality of input signals that may have different phases, magnitudes and frequencies, attenuating means for receiving said input signals and providing selectively attenuating signal outputs in response to attenuating control signals, summing circuit means for summing said attenuating signal outputs with vertical position correction outputs in the positive and negative phases and providing summing circuit outputs, inverting amplifier means for amplifying said summing circuit output providing push-pull outputs in the positive and negative phases of said input signal, first vertical detecting means responsive to said push-pull outputs of said input signal in said positive phase for detecting and providing a series of first vertical output control signals when said push-pull outputs in said positive phase reoccurringly exceeds a given magnitude, up position register means for counting said first vertical output control signals and providing up position output signals reflecting said count, second vertical detecting means responsive to said push-pull outputs of said input signal in said negative phase for detecting and providing a series of second vertical output control signals when said push-pull outputs in said negative phase reoccurringly exceeds a given magnitude, down position register means for counting said second vertical output control signals and providing down position output signals reflecting said count, vertical position correction means responsive to said up position output signals for providing said vertical position correction output in the positive phase having a magnitude proportional to the count in said up position register to said summing circuit means, said vertical position correction means being responsive to said down position output signals for providing said vertical position correction output in the negative phase having a magnitude proportional to the count in said down position register to said summing circuit means, vertical range register means for receiving and sensing the simultaneous occurrence of said up position output signals and said down position output signals reflecting the simultaneous occurrence of counts in said up position register means and said down position register means and in response to said occurrence providing output signals and attenuating control signals to said attenuating means, said vertical range register means having position reset means responsive to said output of said vertical range register means for providing position reset pulses to said up and down position register means, down range generator means responsive to said summing circuit output for detecting and providing a vertical range register reset pulse to said vertical range register when said summing circuit output is below a given magnitude, said vertical range register being reset by said vertical range register reset pulse, down range register interlock means responsive to said up position output signals and said down position output signals reflecting a given count in said up or down position registers for providing a down range inhibiting signal inhibiting said down range generator means from providing said vertical range register reset pulse, and said push-pull outputs controlling the vertical display of said oscilloscope.

8. In an oscilloscope for displaying the waveforms of a plurality of input signals having different frequencies, trigger circuit means responsive to said input signals for providing a triggering output waveform having a frequency proportional to the frequency of said input signal, sweep generator means for providing a sweep speed control waveform that controls the sweep speed of the horizontal display of said oscilloscope and the unblanking signal waveform that controls the display of said oscilloscope, said sweep speed control waveform and said unblanking signal waveform having given synchronized speeds, said sweep generator means being triggered by said triggering output waveform, first divider counter means for receiving said triggering output waveform and counting the cycles in said triggering output waveform providing a first divider counter output pulse for each occurrence of receiving a given minimum number of cycles of said triggering output waveform during the time said first divider counter means is energized, second divider counter means for receiving and counting said first divider counter output pulses and providing a second divider counter output pulse for each occurrence of receiving a given number of said first divider output pulses, sweep-up means being energized by said second divider counter output pulse for providing a sweep-up output pulse, sweep range register means for counting said sweep-up output pulses and providing an output and a horizontal correcting signal output to said sweep generator means reflecting the number of said sweep-up output pulses, said unblanking signal waveform being supplied to said first and second divider counter means for energizing said counter means during the sweep time of the horizontal display and resetting said counters at the termination of said sweep time, minimum count means being in response to said first divider counter output pulses and said unblanking signal waveform for providing an output pulse at the end of said sweep time cycle of said unblanking signal waveform upon the absence of a first divider counter output pulse during said sweep wave cycle, said output pulse of said minimum count means resetting said sweep range register means to a zero count, and the speed of said sweep speed control waveform being controlled by said horizontal correcting signal being impressed on said sweep generator means.

9. In an oscilloscope for displaying the waveforms of a plurality of input signals having different frequencies, trigger circuit means responsive to said input signals for providing a triggering output waveform having a frequency proportional to the frequency of said input signal, sweep generator means for providing a sweep speed control waveform that controls the sweep speed of the horizontal display of said oscilloscope and the unblanking signal waveform that controls the display of said oscilloscope, said sweep speed control waveform and said unblanking signal waveform having given synchronized speeds, said sweep generator means being triggered by said triggering output waveform, first divider counter means for receiving said triggering output waveform and counting the cycles in said triggering output waveform providing a first divider counter output pulse for each occurrence of receiving a given minimum number of cycles of said triggering output waveform during the time said first divider counter means is energized, second divider counter means for receiving and counting said first divider counter output pulses and providing a second divider counter output pulse for each occurrence of receiving a given number of said first divider output pulses, sweep-up means being energized by said second divider counter output pulse for providing a sweep up output pulse, sweep range register means for counting said sweep-up output pulses and providing a horizontal correcting signal output to said sweep generator means reflecting the number of said sweep-up output pulses, horizontal sweep speed decode and readout means responsive to said output of said sweep range register means for displaying the number of counts in said sweep range register means, said unblanking signal waveform being supplied to said first and second divider counter means for engaging said counter means during the sweep time of the horizontal display and resetting said counters at the termination of said sweep time, minimum count means in response to said first divider counter output pulses and said unblanking signal waveform for providing an output pulse at the end of said sweep time cycle of said unblanking signal waveform upon the absence of a first divider counter output pulse during said sweep wave cycle, said output pulse of said minimum count means resetting said sweep range register means to a zero count, and the speed of said sweep speed control waveform being controlled by said horizontal correcting signal being impressed on said sweep generator means.

10. In an oscilloscope for displaying the waveform of a plurality of input signals that may have different phases, magnitudes and frequencies, summing circuit means for summing said input signals with vertical position correction outputs in the positive and negative phases and providing summing circuit outputs, inverting amplifier means for amplifying said summing circuit output providing push-pull outputs in the positive and negative phases of said input signal, first vertical detecting means responsive to said push-pull outputs of said input signal in said positive phase for detecting and providing a series of first vertical output control signals when said push-pull outputs in said positive phase reoccurringly exceeds a given magnitude, up position register means for counting said first vertical output control signals and providing up position output signals reflecting the count in said up position register means, second vertical detecting means responsive to said push-pull outputs of said input signal in said negative phase for detecting and providing a series of second vertical output control signals when said push-pull outputs in said negative phase reoccurringly exceeds a given magnitude, down position register means for counting said second vertical output control signals and providing down position output signals reflecting said count in said down position register means, position decode and readout means responsive to said up position output signals and said down position output signals for displaying the number of counts in said up position register means and said down position register means, vertical position correction means responsive to said up position output signals for providing said vertical position correction output in the positive phase having a magnitude proportional to the count in said up position register to said summing circuit means, said vertical position correction means being responsive to said down position output signals for providing said vertical position correction output in the negative phase having a magnitude proportional to the count in said down position register to said summing circuit means, vertical decode means for receiving and sensing the simultaneous occurrence of said up position output signals and said down position output signals reflecting the simultaneous occurrence of counts in said up position register means and said down position register means and in response to said occurrence providing output signals, position reset means responsive to said output signals of said vertical decode for providing reset pulses to said up and down position register means, and said push-pull outputs controlling the vertical display of said oscilloscope.

11. In an oscilloscope for displaying the waveforms of a plurality of input signals having different frequencies, trigger circuit means responsive to said input signals for providing a triggering output waveform having a frequency proportional to the frequency of said input signal, sweep generator means for providing a sweep speed control waveform that controls the sweep speed of the horizontal display of said oscilloscope and the unblanking signal waveform that controls the display of said oscilloscope, said sweep speed control waveform and said unblanking signal waveform having given synchronized speeds, said sweep generator means being triggered by said triggering output waveform, first divider counter means for receiving said triggering output waveform and counting the cycles in said triggering output waveform providing a first divider counter output pulse for each occurrence of receiving a given minimum number of cycles of said triggering output waveform during the time said first divider counter means is energized, second divider counter means for receiving and counting said first divider counter output pulses and providing a second divider counter output pulse for each occurrence of receiving a given number of said divider output pulses, sweep-up means being energized by said second divider counter output pulse for providing a sweep-up output pulse, sweep range register means for counting said sweep-up output pulses and providing a horizontal correcting signal output to said sweep generator means reflecting the number of said sweep-up output pulses, horizontal sweep speed decode and readout means responsive to said output of said sweep range register means for displaying the number of counts in said sweep range register means, said unblanking signal waveform being supplied to said first and second divider counter means for energizing said counter means during the sweep time of the horizontal display and resetting said counters at the termination of said sweep time, and the speed of said sweep speed control waveform being controlled by said horizontal correcting signal being impressed on said sweep generator means.

12. In an oscilloscope for displaying the waveform of a plurality of input signals that may have different phases, magnitudes and frequencies, attenuating means for receiving said input signals and providing selectively attenuated signal outputs in response to attenuating control signals, summing circuit means for summing said attenuated signal outputs with vertical position correction outputs in the positive and negative phases and providing summing circuit outputs, inverting amplifier means for amplifying said summing circuit outputs providing push-pull outputs in the positive and negative phases of said input signal, first vertical detecting means responsive to said push-pull outputs of said input signal in said positive phase for detecting and providing a series of first vertical output control signals when said push-pull outputs in said positive phase reoccurringly exceed a given magnitude, up position register means for counting said first vertical output control signals and providing up position output signals reflecting the count in said up position register means, second vertical detecting means responsive to said push-pull outputs of said input signal in said negative phase for detecting and providing a series of second vertical output control signals when said push-pull outputs in said negative phase reoccurringly exceeds a given magnitude, down position register means for counting said second vertical output control signals and providing down position output signals reflecting said count in said down position register means, position decode and readout means responsive to said up position output signals and said down position output signals for displaying the number of counts in said up position register means and said down position register means, vertical position correction means responsive to said up position output signals for providing said vertical position correction output in the positive phase having a magnitude proportional to the count in said up position register to said summing circuit means, said vertical position correction means being responsive to said down position output signals for providing said vertical position correction output in the negative phase having a magnitude proportional to the count in said down position register to said summing circuit means, vertical range register means for receiving and sensing the simultaneous occurrence of said up position output signals and said down position output signals reflecting the simultaneous occurrence of counts in said up position register means and said down position register means and in response to said occurrence providing output signals and attenuating control signals to said attenuating means, vertical sensitivity decode and readout means responsive to said output signals of said vertical range register means for displaying the number of counts in said vertical range register means, said vertical range register means having position reset means for sensing the simultaneous occurrence of counts in said up position register means and said down position register means and providing position reset pulses to said up and down position register means, down range generator means responsive to said summing circuit output for detecting and providing a vertical range register reset pulse to said vertical range register when said summing circuit output is below a given magnitude, said vertical range register being reset by said vertical range register reset pulse, down range register interlock means responsive to said up position output signals and said down position output signals reflecting a given count in said up or down position registers for providing a down range inhibiting signal inhibiting said down range generator means for providing said vertical range register reset pulse, and said push-pull outputs controlling the vertical display of said oscilloscope.

13. In an oscilloscope for displaying the waveforms of a plurality of input signals having different magnitudes and frequencies, vertical deflection circuitry means for selectively increasing and decreasing said magnitudes of said input signals providing vertical deflection output signals to said oscilloscope, vertical detecting circuit means being electrically connected to said vertical deflection circuitry means for detecting the magnitudes of said input signals and providing vertical output signals when said magnitudes of said input signals are outside a given range of magnitudes, vertical correction circuit means being electrically connected to said vertical deflection circuitry means and being responsive to said vertical output signals for providing vertical correction signals to said vertical deflection circuitry means that selectively increase or decrease said magnitudes of said input signals in said vertical deflection circuitry means bringing said magnitudes within said given range of magnitudes, horizontal sweep circuit means being responsive to said input signals for providing horizontal sweep control voltages having selected sweep speeds to said oscilloscope, horizontal detecting circuit means for detecting said sweep speeds of said horizontal sweeps control voltages and said frequencies of said input signals and for providing horizontal output signals when the number of cycles of said input signals occurring during a given sweep are outside a given range of cycles, horizontal correction circuit means responsive to said horizontal output signals for providing a horizontal correction voltage to said horizontal sweep circuit means adjusting the sweep speed of said horizontal sweep control voltage to a given sweep speed in which the number of cycles of said input signal occurring during said given sweep speed are within said given range of cycles.

14. In an oscilloscope for displaying wave forms of input signals,
sweep circuit means for providing at least more than two different sweep control voltages,
detecting circuit means for comparing sweep speed control voltages with the frequency of cycles of said input signals and for providing output control signals when the number of cycles of said input signals occurring during said given sweep are outside a given range,
and circuit means responsive to said control signals for changing the sweep speed.

15. In an oscilloscope for displaying the wave forms of an input signal,
sweep circuit means for providing more than two different sweep control voltages for changing the sweep speed of said oscilloscope,
detecting circuit means for comparing the sweep speed of said sweep circuit means and the frequency of said input signal and for providing output control signals,
and circuit means responsive to said output control signals for supplying signals to said sweep circuit means for providing a sweep speed that displays a given range of cycles of said input signal.

16. In an oscilloscope for displaying waveforms of a plurality of input signals having positive and negative voltages,
first vertical deflection means for sensing the magnitude of the positive voltage of said input signals,
second vertical deflection means for sensing the magnitude of the negative voltage of said input signals,
and position control means in response to said first and second deflection means for reducing said magnitude of said positive voltage input signal when said positive voltage exceeds a given magnitude range and for reducing said magnitude of said negative voltage input signal when said negative voltage exceeds a given magnitude range.

17. In an oscilloscope for displaying waveforms of a plurality of input signals having positive and negative voltages,
first vertical deflection means for sensing the magnitude of the positive voltage of said input signals,
second vertical deflection means for sensing the magnitude of the negative voltage of said input signals,
position control means in response to said first and second deflection means for reducing said magnitude of said positive voltage input signal when said positive voltage exceeds a given magnitude range and for reducing said magnitude of said negative voltage input signal when said negative voltage exceeds a given magnitude range,
and attenuator means responsive to said first and second deflection means for attenuating both of said positive and negative voltages when said positive and negative voltages exceed a given magnitude range.

18. In an oscilloscope for displaying waveforms of a plurality of input signals having positive and negative voltages,
first vertical deflection means for sensing the magnitude of the positive voltage of said input signals,
second vertical deflection means for sensing the magnitude of the negative voltage of said input signals,
position control means in response to said first and second deflection means for separately reducing said magnitude of said positive voltage input signal when said positive voltage exceeds a given magnitude range and for separately reducing said magnitude of said negative voltage input signal when said negative voltage exceeds a given magnitude range,
means inhibiting said position control means in reducing the magnitudes of said positive voltage input signal and said negative voltage input signal simultaneously,
and attenuator means responsive to said first and second deflection means for attenuating both of said positive and negative voltages when said positive and negative voltages exceed a given magnitude range.

19. In an oscilloscope for displaying waveforms of a plurality of input signals having positive and negative voltages,
first vertical deflection means for sensing the magnitude of the positive voltage of said input signals,
second vertical deflection means for sensing the magnitude of the negative voltage of said input signals,
position control means in response to said first and second deflection means for separately reducing said magnitude of said positive voltage input signal when said positive voltage exceeds a given magnitude range and for separately reducing said magnitude of said negative voltage input signal when said negative voltage exceeds a given magnitude range,
attenuator means responsive to said first and second deflection means for attenuating both of said positive and negative voltages when said positive and negative voltages exceed a given magnitude range,
and display means for displaying the amount of reduction in magnitude of said positive voltage input signal and said negative voltage input signal.

20. An oscilloscope for displaying waveforms of a plurality of input signals comprising,
vertical deflections means for sensing the magnitude of the voltage of said input signals,
position control means in response to said vertical deflection means for reducing the voltage magnitude of said input signals when said voltage exceeds a given magnitude range,
and oscilloscope display means for displaying the waveform of said reduced in magnitude signals.

References Cited by the Examiner
UNITED STATES PATENTS
2,962,625  11/60  Berwin et al. _____ 315—26

DAVID G. REDINBAUGH, *Primary Examiner.*